Figure 1:
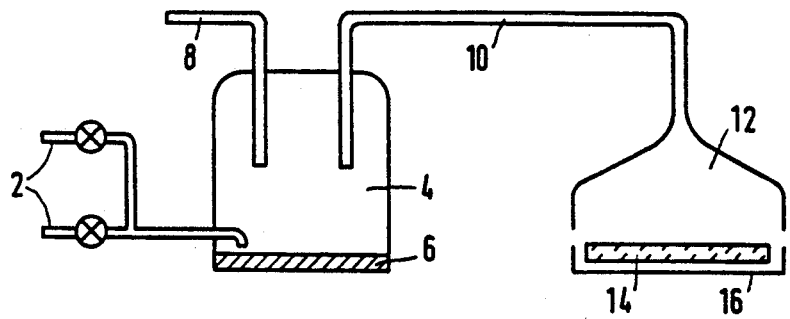

United States Patent

Van De Leest et al.

[11] Patent Number: 5,254,904
[45] Date of Patent: Oct. 19, 1993

[54] ANTIREFLECTIVE COATING LAYER IN PARTICULAR FOR A CATHODE RAY TUBE

[75] Inventors: Renaat E. Van De Leest; Maarten Buijs, both of Eindhoven, Netherlands

[73] Assignee: U.S. Philips Corporation, New York, N.Y.

[21] Appl. No.: 750,806

[22] Filed: Aug. 27, 1991

[30] Foreign Application Priority Data

May 21, 1991 [EP] European Pat. Off. ........ 91201209.3

[51] Int. Cl.$^5$ .......................... H01J 29/28; G02B 1/10
[52] U.S. Cl. ..................... 313/479; 313/478; 359/609; 359/614
[58] Field of Search ............... 313/478, 474, 479, 110; 359/890, 609, 614

[56] References Cited

U.S. PATENT DOCUMENTS

| 2,734,142 | 2/1956 | Barnes | 359/609 X |
| 4,753,516 | 6/1988 | Doi et al. | 359/614 |
| 4,830,879 | 5/1989 | Debsikdar | 427/162 |
| 5,045,751 | 3/1991 | Numata et al. | 313/479 |

FOREIGN PATENT DOCUMENTS

| 248342 | 1/1986 | Japan | 313/478 |
| 6902 | 1/1989 | Japan | 359/614 |

Primary Examiner—Sandra L. O'Shea
Attorney, Agent, or Firm—Paul R. Miller

[57] ABSTRACT

An antireflective coating layer 22 is applied to a substrate 20, the coating layer having a refractive index gradient such that the refractive index decreases in the direction from the substrate surface 24 to the outside surface 26 of the coating layer. An organic solution of an alkoxide starting material is provided on the substrate and is converted into a gel in situ by means of a reaction with water, which gel is subsequently dried. During the formation of the gel the reaction conditions are varied in such a manner that a non-porous gel is formed in which the degree of crosslinking of the gel material increases in the direction from the substrate surface to the outside surface of the coating layer.

7 Claims, 1 Drawing Sheet

ANTIREFLECTIVE COATING LAYER IN PARTICULAR FOR A CATHODE RAY TUBE

The invention relates to an antireflective coating layer on a substrate, which coating layer has a refractive index gradient such that the refractive index decreases in the direction from the substrate surface to the outside surface of the coating layer, which coating layer consists of a gel.

The invention also relates to a cathode ray tube comprising a display window having an antireflective coating layer.

The invention further relates to a method of manufacturing an antireflective coating layer on a substrate, which coating layer has a refractive index gradient such that the refractive index decreases in the direction from the substrate surface to the outside surface of the coating layer, which coating layer consists of a gel which is formed by means of a reaction of an alkoxide starting material with water.

BACKGROUND OF THE INVENTION

Antireflective coating layers are used, for example, on display screens of display devices, on cover plates of solar collectors, on envelopes of light sources and on other optical elements such as lenses and windows, to reduce reflection losses of traversing light and to suppress disturbing reflections in images.

In U.S. Pat. No. 4,830,879 a method of manufacturing an antireflective layer is described. By means of a reaction of an alkoxide starting material with water various solutions with gel particles are manufactured, which solutions exhibit a graded particle size. Successive layers of solutions having an increasing particle size are applied to a substrate and dried. The layer thus manufactured is porous and exhibits an increasing grain size and pore size in the direction from the substrate surface to the outside surface of the layer. As a result of the decreasing average density in the layer, there is a corresponding decrease of the refractive index. Alkoxides, for example methoxy and ethoxy compounds of silicon, titanium and aluminium are used as the starting material, the optical properties of the layer being adaptable by means of dopants.

A disadvantage of the known antireflective layer is that it is porous and, hence, mechanically weak. This disadvantage also occurs with other methods of rendering substrate surfaces antireflective, for example when the substrate is roughened by means of etching. A further disadvantage of the known method consists in the necessity to use a number of different solutions which are successively applied to the surface and which each require a drying step. Such a method comprises many steps and is unsuitable to be carried out as a continuous method.

SUMMARY OF THE INVENTION

It is an object of the invention to provide, inter alia, mechanically strong antireflective layers having a high scratch resistance and a small sensitivity to the action of moisture. A particular object of the invention is to provide a cathode ray tube which is provided with such an improved antireflective layer. A further object of the invention is to provide a simple and efficacious method of manufacturing antireflective layers, which method must preferably be suitable to be carried out as a continuous method.

According to the invention, these objects are achieved by an antireflective coating layer as described in the opening paragraph, which coating layer is a closed layer and the degree of crosslinking of the gel material increases in the direction from the substrate surface to the outside surface of the coating layer. As a result of the increase of the degree of crosslinking in the gel material, the degree of order and the packing density in the material decrease, so that the refractive index decreases. The expression "a closed layer" is to be understood to mean herein that the layer is not or substantially not porous as opposed to the known antireflective layer according to U.S. Pat. No. 4,830,879.

In a preferred embodiment of the antireflective coating layer according to the invention, the coating layer consists of contiguous grains whose dimensions decrease in the direction from the substrate surface to the outside surface of the coating layer. By using such a layer the remaining specular reflection is partially converted to diffuse reflection (antiglare action), which is important for applications in display devices to preclude disturbing images of, for example, external light sources on a display screen.

Suitable gel materials for use in layers having a refractive index gradient are materials which can, for example, be manufactured with alkoxides of the $M(OR)_x$ type, where M is a metal atom such as Si, Al, Ti, where R is an alkyl group having 1 to 5 carbon atoms and where x is the valency of the metal atom, see U.S. Pat. No. 4,830,879. In a particular embodiment of the invention, the antireflective coating layer consists of a silica gel which, if desired, may comprise dopants. The use of silica gel, which can be manufactured by using alkoxysilanes as the starting material, provides a mechanically strong, temperature resistant layer having a low refractive index. Within the scope of the invention, the optical and other properties of the antireflective layer can be influenced by using dopants, see for example U.S. Pat. No. 4,830,879. Oxides of chromium and/or aluminium can be used to influence the transmission properties of the layer. Metal particles can be used to increase the electric conductivity of the layer, as a result of which the layer may obtain an antistatic effect.

According to the invention, the object of providing a cathode ray tube having an improved antireflective coating layer is achieved in that the coating layer consists of a non-porous gel, the degree of crosslinking of the gel material increasing in the direction from the surface of the display window to the outside surface of the coating layer, as a result of which the coating layer has a refractive index gradient such that the refractive index decreases in the direction from the surface of the display window to the outside surface of the coating layer.

According to the invention, the object of providing a method of manufacturing an antireflective coating layer on a substrate is achieved by a method as described in the opening paragraph, in which an organic solution of the alkoxide starting material is provided on the substrate and converted into a gel in situ by means of a reaction with water, which gel is subsequently dried, and during the formation of the gel the reaction conditions are varied in such a manner that a non-porous gel is formed in which the degree of crosslinking of the gel material increases in the direction from the substrate surface to the outside surface of the coating layer. Short chain alcohols, for example methanol and ethanol, or ketones can be used as the solvent of the organic solution, also see U.S. Pat. No. 4,830,879.

A layer having a refractive index with a regular variation and a layer having a low porosity and hence a low degree of light scattering are obtained according to a method in which the organic solution of the alkoxide starting material is atomized, preferably by using ultrasonic energy supply, after which the mist formed is brought into contact with the substrate surface to which the coating layer is applied.

In a preferred embodiment of the method according to the invention, the increase of the degree of crosslinking is obtained by raising the temperature during the formation of the gel. At a relatively low temperature, linear chains are formed during the reaction with water, as a result of which a regular and compact structure having a high density and a high refractive index is formed. At a relatively high temperature a greater degree of crosslinking takes place, which results in a less compact structure having a lower density and a lower refractive index. An additional effect is that at a relatively high temperature, there is less coalescence of the mist droplets and they dry more rapidly, thus forming smaller grains on the outside of the antireflective layer. Such layers have a particularly effective antireflective and antiglare effect.

The degree of crosslinking of the gel can also be influenced in various other ways. The increase of the degree of crosslinking can be obtained by increasing the degree of acidity during the formation of the gel. In an acid medium, as at a low temperature, linear chains are formed, whereas in an alkaline medium an irregular network is formed. The increase of the degree of crosslinking can alternatively be obtained by reducing the concentration of the alkoxide starting material in the organic solution, which, as a side effect, causes the grain size (after the drying of the droplets) to decrease in the direction of the outside surface of the antireflective layer. The increase of the degree of crosslinking can also be attained by using alkoxide starting materials having an increasing degree of hydrolysis, in which process the composition of the material used can be varied continuously or in small steps. Suitable starting materials are alkoxysilanes of the formula $Si(OR)_{4-p}(OH)_p$, where R is, for example, a methyl group or an ethyl group and where p has a value of 0 to 4. An increasing degree of hydrolysis corresponds to an increasing value of p.

An additional advantage of the use of a mechanically strong antireflective layer according to the invention is formed by the fact that it has a reinforcing effect on the underlying substrate, as described per se in European Patent Application EP-A1-0294830. By virtue thereof, for example in the case of a cathode ray tube, use can be made of a thinner display screen which results in a saving in glass and a weight reduction of 10 to 15%.

BRIEF DESCRIPTION OF THE DRAWING FIGURES

Figure 2:
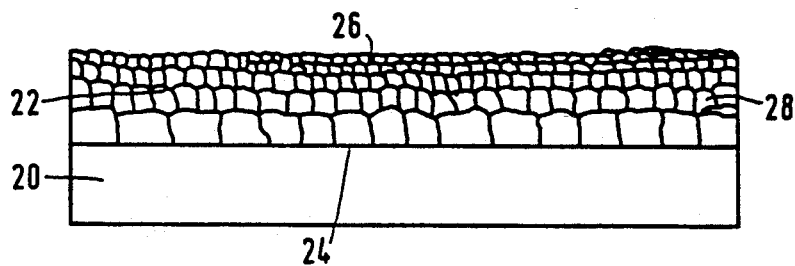
Figure 3:
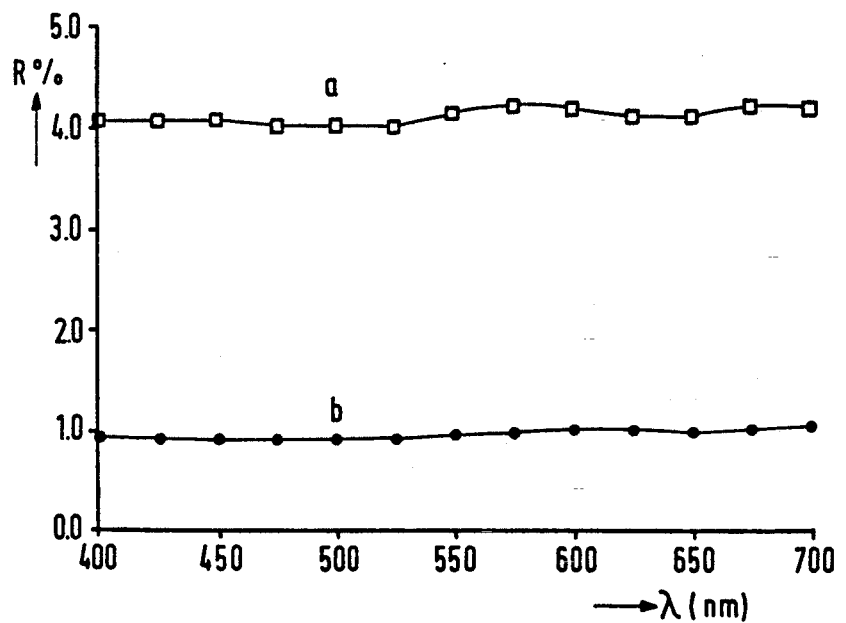
Figure 4:
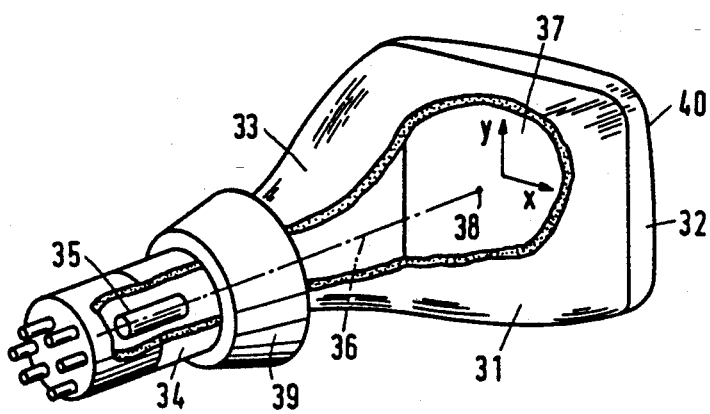

The invention will be explained in greater detail by means of exemplary embodiments and a drawing, in which FIG. 1 diagrammatically shows a device which is suitable for carrying out the method according to the invention, FIG. 2 is a diagrammatic cross-sectional view of a substrate having an antireflective coating layer according to the invention, FIG. 3 shows the reflection R as a function of the wavelength $\lambda$, and FIG. 4 is a partly cut-away perspective view of an embodiment of a cathode ray tube according to the invention.

DESCRIPTION OF THE INVENTION

Exemplary embodiment 1

FIG. 1 diagrammatically shows a device for carrying out the method according to the invention. Starting materials for the manufacture of an antireflective layer are supplied from storage containers which are not shown in the Figure via pipes 2, the quantities of each of the starting materials being separately controllable. The supply pipes 2 carry the liquid starting materials in drops to a nebulizer 4 which is provided with an ultrasonic element 6. A carrier gas can be supplied via a separate pipe 8, which carrier gas can be used to transport the mist to be formed via a transport pipe 10 to a deposition chamber 12. In the deposition chamber the mist is brought into contact with the substrate 14 to be coated which is placed on a heating plate 16.

According to this exemplary embodiment, an alcoholic solution of an alkoxysilane and water with a small quantity of hydrochloric acid were used as the starting materials. The alcoholic solution consisted of ethanol with an alkoxysilane having the composition $Si(OC_2H_5)(OH)_3$, where the molar ratio between ethanol and alkoxysilane was 13:1. To catalyze the hydrolysis a small quantity of an acid, for example hydrochloric acid or nitric acid may be added to the water, see U.S. Pat. No. 4,830,879. According to the example, a solution containing $10^{-3}M$ nitric acid was used. The ratio between the quantities of water and the alcoholic solution was selected such that 4 mol of water was present to 1 mol of the alkoxysilane.

A polished glass plate was used as the substrate. The refractive index of the glass was 1.52, the reflection at a wavelength of 550 nm was 4.2%. For 20 minutes the substrate was brought into contact with a mist as described hereinbefore, during which period the temperature of the substrate was gradually increased from an initial value of 23° C. to a final value of 55° C. Subsequently, the layer was baked for 30 minutes at a temperature of 150° C. An antireflective layer having a thickness of 300 nm was provided. The layer thickness can be influenced according to the requirements by varying the duration of the deposition, by varying the concentration of the materials used, and by adjusting the gas flow and the mist flow, respectively.

The outside surface of the antireflective layer had a refractive index of approximately 1.36. The reflection was less than 1.0%, a part of which was in the form of diffuse relection. FIG. 2 shows a diagrammatic cross-sectional view of a substrate 20 having an antireflective layer 22. In the layer, contiguous grains 28 can be recognized the dimension of which decreases in the direction from the polished substrate surface 24 to the outside surface 26.

FIG. 3 shows the reflection R as a function of the wavelength of light, measured at the front of a glass plate without an antireflective layer (a), and with an antireflective layer as described hereinbefore (b).

If desired, the substrate surface may be pretreated to ensure that the mist deposits on the surface as a continuous layer and not in the form of large drops. For this purpose, methods which are known per se can be used to render the substrate hydrophilic or hydrophobic in accordance with the composition and the hydrophilic/hydrophobic character of the material to be applied.

Exemplary embodiment 2

FIG. 4 diagrammatically shows a cathode ray tube with a glass envelope 31, which is known per se, and which comprises a display window 32, a cone 33 and a neck 34. An electron gun 35 for generating an electron beam 36 is accommodated in the neck. The electron beam 36 is focused to a spot 38 on a display screen 37. The display screen is provided on the inside of the display window 32. The electron beam 36 is deflected across the display screen 37 in two mutually perpendicular directions x-y by means of the deflection coil system 39. A layer of a luminescing material (phosphor) is present on the display screen 37. The display window 32 is provided with an antireflective layer 40 on the outside, which antireflective layer was manufactured as described in exemplary embodiment 1.

Exemplary embodiment 3

The method was carried out as described in exemplary embodiment 1, with the difference that the temperature was kept constant at a value of 30° C. During the deposition process the degree of acidity of the water added was reduced in small steps from $10^{-3}$M to $10^{-4}$M, thus causing the density of the layer manufactured to decreased gradually. Also in this case, there was a clear decrease of the reflection at the surface.

Exemplary embodiment 4

The method was carried out as described in exemplary embodiment 1, with the difference that the temperature was kept constant at a value of 30° C. During the deposition process the alcoholic solution used was gradually diluted further with ethanol, the ratio between ethanol and alkoxysilane being gradually changed from 10:1 to 25:1. The reflection decreased clearly and the structure of the antireflective layer was the same as shown in FIG. 2.

Exemplary embodiment 5

The method was carried out as described in exemplary embodiment 1, with the difference that the temperature was kept constant at a value of 30° C. During the deposition process, successively, alkoxysilanes with an increasing degree of hydrolysis were used by varying the quantity of water added from an initial value of 1:1 to a final value of 4:1, expressed in the molar ratio of water relative to alkoxysilane. The reflection at the layer thus manufactured was less than 1.0%.

We claim:

1. An antireflective coating layer on a substrate comprising a coating layer of a gel material having an index of refraction decreasing from the substrate to the outer surface of said coating layer, said coating layer being a closed layer substantially free of porosity, and said gel material having a degree of crosslinking increasing from said substrate to said outer surface.

2. An antireflective coating layer according to claim 1, wherein said coating layer consists of contiguous grains having dimensions decreasing from said substrate to said outer surface.

3. An antireflective coating layer according to claim 2, wherein said gel material consists of a silica gel.

4. An antireflective coating layer according to claim 1, wherein said gel material is an alkoxide of the $M(OR)_x$ type where M is a metal atom, R is an alkyl group having 1 to 5 carbon atoms, and x is the valency of the metal atom.

5. An antireflective coating layer according to claim 3, wherein said silica gel contains dopants.

6. An antireflective coating layer according to claim 1, wherein said coating layer has a reflection of light of at most 1%.

7. A cathode ray tube comprising a display window and an antireflective coating layer disposed on said display window, said coating layer consisting of a nonporous gel, said gel having a degree of crosslinking increasing from said display window to an outer surface of said coating layer, said coating layer having a refractive index gradient decreasing from said display window to said outer surface.

* * * * *